April 24, 1934. J. R. THORP Re. 19,145

FROST SHIELD

Original Filed Dec. 15, 1930

INVENTOR.

BY J. R. Thorp.

Morsell & Morsell

ATTORNEY.

Reissued Apr. 24, 1934

Re. 19,145

UNITED STATES PATENT OFFICE 19,145

FROST SHIELD

Joel R. Thorp, West Allis, Wis., assignor to The Fulton Company, West Allis, Wis., a corporation of Wisconsin Original No. 1,914,183, dated June 13, 1933, Serial No. 502,387, December 15, 1930. Application for reissue October 20, 1933, Serial No. 694,489

9 Claims. (Cl. 219—19)

The present invention relates in general to improvements in apparatus for maintaining transparent windows, such as the windshield and side windows of a vehicle, free from vision obstructing coatings, such as moisture, frost, sleet and snow, so that the occupants of the vehicle enclosure may have a clear view of the outside surroundings in all kinds of weather.

Generally stated, an object of the invention is to provide an improved device for maintaining clear vision through a window, which is simple in construction and which is moreover highly efficient in operation.

Many appliances intended for the purpose of maintaining clear vision through the windshield of an automobile or the like, have heretofore been proposed, but all of these prior devices are more or less objectionable. In some of these prior devices, it has been proposed to utilize rubber vacuum cups for the purpose of removably attaching the appliances to the windows, relying upon the impositive action of the cups to hold the device in place. In others of these prior appliances, it was contemplated to utilize a heating medium, such as an electric wire receiving current from the automobile battery or ignition system, to dispel the moisture and other view obtructing coatings which tended to accumulate on the windshield or windows, and in these proposed devices it was contemplated to utilize relatively complicated and ineffective means for maintaining the heating wires taut and for conducting the current thereto. In addition to the objects specifically mentioned, the prior devices of this general type were also objectionable because of their inability to effectively accomplish their intended purpose.

It is a more specific object of the present invention to provide various improvements in the construction of appliances of this kind, which while embodying some of the desirable features of the prior types above referred to, do not introduce the objectionable features thereof.

Another specific object of the invention is to provide a device for maintaining clear vision through a window, which may be conveniently and firmly attached to the window, or removed therefrom, whenever desired, and which does not rely upon the suction action of a set of cups to maintain the device in place.

A further object of the invention is to provide an electrically heated clear vision appliance which is simple and compact in construction and wherein the wires used for heating purposes are maintained taut by simple and effective instrumentalities.

Still another specific object of the invention is to provide an improved frame structure for supporting a sheet of transparent material in position adjacent to a window or the like.

Another specific object of the invention is to provide an improved clear vision accessory for automobile windshields or the like, which will effectively prevent accumulation of objectionable matter upon the outside or exposed surfaces of the shield, without the aid of a wiper, such as is frequently applied to windshields or the like.

A further object of the invention is to provide an improved device for maintaining clear vision through a window, which is light and sturdy in construction, and which moreover presents an extremely neat appearance, permitting its use with any automobile.

Still another object of the invention is to provide an improved accessory for maintaining clear vision through a windshield or the like, which may be manufactured at minimum cost, and which eliminates danger of breaking the shield or window to which it is applied.

These and other objects and advantages will be apparent from the following description.

A clear conception of an embodiment of the invention and of the mode of constructing and of utilizing devices built in accordance therewith, may be had by referring to the drawing accompanying and forming a part of this specification, in which like reference characters designate the same or similar parts in the several views.

Figure 1:
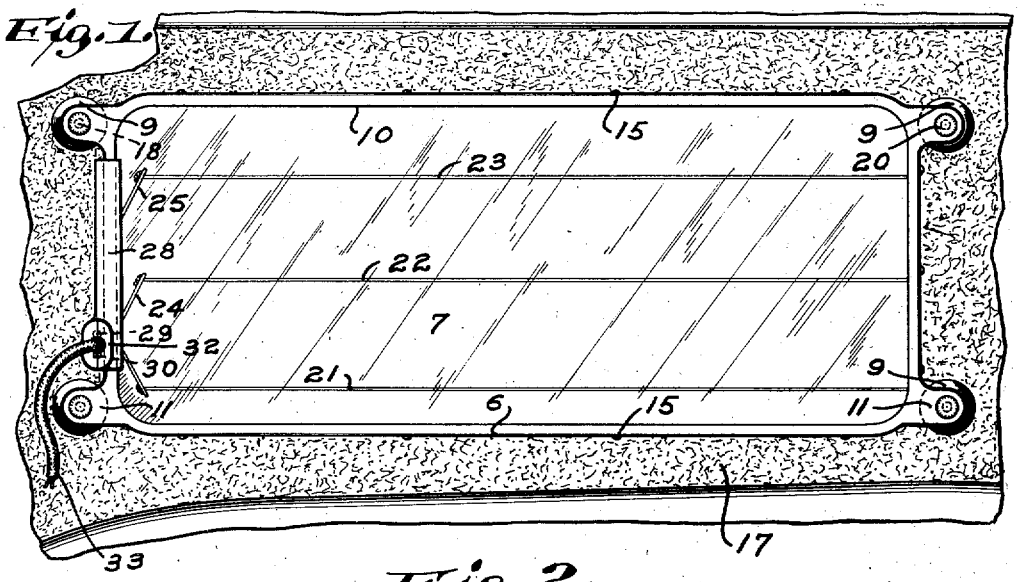
Fig. 1 is a rear view of a fragment of a frost coated vehicle windshield, showing one of the improved frost shields applied thereto.

While the improved appliance will hereinafter be referred to as a frost shield, it will be understood that this device is not merely capable of maintaining the surface of a window to which it is applied, free from frost, but the device will in fact function to maintain the window free from practically all kinds of vision obstructing coatings or deposits.

The improved frost shield shown in the drawing by way of illustration, comprises in general a one-piece continuous frame 6; a transparent sheet 7 fitted within the frame 6; a sealing strip 8 secured to the frame 6 at the periphery of the shield 7; supporting elements 9 detachably associated with the four corners of the frame 6; and means for creating heat within the enclosure formed by the frame 6 and the transparent sheet 7.

Figure 4:
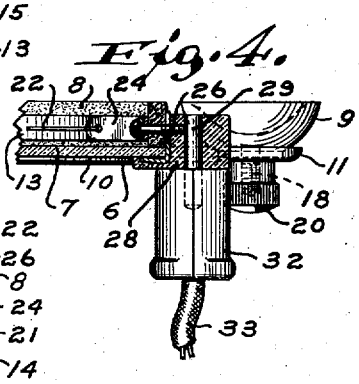
Fig. 4 is an enlarged fragmentary section through the shield, the section being taken along the line 4—4 of Fig. 2.
Figure 5:
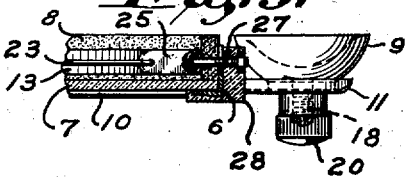
Fig. 5 is a similarly enlarged fragmentary section taken along the line 5—5 of Fig. 2.

The frame 6 is preferably stamped from a single sheet of relatively thin metal, and has a continuous integral flange 10 extending inwardly and inclined slightly toward the transparent sheet 7, as shown in Figs. 4 and 5, so that only the free edge of the flange 10 resiliently engages the sheet 7 to provide a perfect seal without undesirably stressing the transparent sheet. The corners of the frame 6 are provided with integral outwardly extending ears 11 forming pockets contiguous with the sheet receiving portion of the frame 6, and these ears 11 moreover facilitate attachment of the frame 6 to the supporting elements 9.

Figure 2:
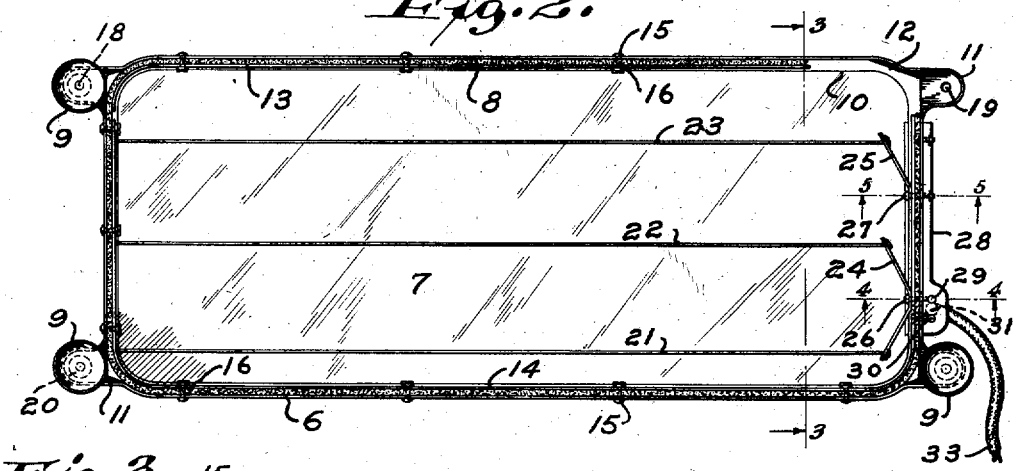
Fig. 2 is a view looking into one of the improved frost shields, with one of the attaching elements removed and with some of the remaining structures also broken away.
Figure 3:
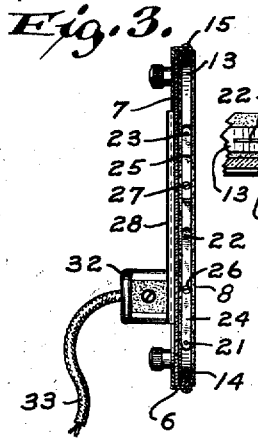
Fig. 3 is a section through the shield, the section being taken along the line 3—3 of Fig. 2 looking in the direction of the arrows.

The transparent sheet 7 is preferably formed of glass cut to properly fit within the frame 6 and cooperable with the continuous flange 10, as previously indicated. When the ears 11 are disposed slightly away from the extreme corners of the frame 6, as shown in Figs. 1 and 2, the corners 12 of the glass sheet 7 may be cut away along straight lines, as indicated at the upper right hand corner of Fig. 2, and the pockets provided by the ears 11 permit the corners of the sheet 7 to overlap the rounded corners of the frame structure without necessitating corresponding rounding of the corners of the glass sheet. Such rounding of the corners of the sheet 7 is objectionable since it introduces excessive breakage of glass during the manufacturing process.

The sealing strip 8 may be formed of felt, rubber or other suitable material, and is attached to the interior of the peripheral flange of the frame 6 by means of two segregated conductor bands 13, 14 and rivets 15. The bands 13, 14 are insulated from each other by spaces at their adjacent ends, and also by means of insulating washers 16 coacting with the rivets 15, so that no electrical connection exists between the bands 13, 14 except through the heating means, which will be subsequently described herein. The bands 13, 14 are formed of flat stock and coact only with the sealing strip 8 throughout substantially the entire length of the latter, these bands thereby constituting sections forming a substantially continuous retainer band which is spaced from the glass sheet 7 so as to permit the sealing strip 8 to absorb the clamping pressure without subjecting the sheet to excessive local stresses such as would result from direct contact of the band with the glass. One of the longitudinal edges of the sealing strip 8 snugly engages the inner surface of the glass sheet 7, while the opposite edge thereof projects laterally beyond the periphery of the frame 6, as clearly shown in Figs. 4 and 5. When the projecting edge of the sealing strip 8 is brought into contact with a windshield 17 or other window, and is slightly compressed, a sealed space is produced between the glass sheet 7 and the inner surface of the windshield 17.

Each of the supporting elements 9 comprises a block of material such as rubber, having a threaded stud 18 formed integral therewith. The blocks of material may be dished to provide for slight suction action during application of the elements 9 to the windshield 17, but this suction action is not relied upon to permanently hold the elements in place. The elements 9 are cemented directly to the surface of the windshield 17 in order to insure permanent union of the coacting parts, and as previously indicated, the suction action produced by the dishing of the elements is only utilized to hold the elements in place until the cement has become effective.

When the four supporting elements 9 have been properly positioned and permanently attached to the windshield 17, the integral studs 18 thereof are disposed parallel to each other, and the frame 6 may then be applied to the elements 9 by passing the element studs through the openings 19 of the ears 11. Clamping caps 20 are applicable to the studs 18 to clamp the frame 6 against the elements 9 and to simultaneously compress the sealing strip 8 in order to produce the sealed space between the transparent sheet 7 and windshield 17, previously referred to. With such means of attachment, the elements 9 may obviously be permanently attached to the windshield 17, while still permitting ready removal of the frame 6 and associated parts by merely removing the caps 20 and slipping the frame off of the studs 18.

The means for heating the confined space between the glass sheet 7 and the windshield 17, comprises a plurality of parallel properly spaced wires 21, 22, 23 and leaf springs 24, 25 for maintaining these wires taut at all times. The wires 21, 22, 23 span the frame 6 longitudinally, and have their corresponding ends attached directly to the conductor band 14. The opposite corresponding ends of the wires 21, 22 are attached to the ends of the double leaf spring 24, and the corresponding end of the wire 23 is likewise attached to the free end of the leaf spring 25, the medial portion of the spring 24 and the opposite end of the spring 25 being rigidly attached to the conductor band 13 by means of screws 26, 27 respectively, as shown in Figs. 4 and 5. The screws 26, 27 besides serving to clamp the adjacent portion of the band 13 against the sealing strip 8, also coact with an elongated block 28 of insulating material which extends along and snugly engages one side of the frame 6 and carries terminals 29, 30. The screw 26 coacts directly with the terminal 29 as shown in Fig. 4, to form an electrical connection between this terminal and the conductor band 13 which is electrically connected to the adjacent ends of the wires 21, 22, 23, and another screw 31 likewise connects the conductor band 14 with the terminal 30, thereby completing the circuit from the terminal 29 to the terminal 30 through the band 13, springs 24, 25, wires 21, 22, 23, and band 14. The peripheral flange of the frame 6 is notched so as to avoid direct contact between the metal frame 6 and the conducting screws 26, 27, 31, and a removable contact plug 32 and wiring 33 connected to a suitable source of electrical energy, serve to energize the heating system.

When the supporting elements 9 have been properly positioned and permanently cemented to the inner surface of the windshield 17, the frame 6 should be first loosely applied to the studs 18 and the plug 32 should then be applied to the terminals 29, 30 to cause the wires 21, 22, 23 to heat and dry the air within the space between the sheet 7 and shield 17 and to permit any moisture therein to escape before the sealing strip is compressed into contact with the windshield. After this initial drying operation has been effected, the clamping caps 20 may be screwed down to firmly clamp the frame 6 in position and to seal the space within which the heating wires 21, 22, 23 are enclosed. The wires 21, 22, 23 when energized, will then effectively heat the confined air and the heat will be radiated from the confined body of dry air, through the glass sheet 7 and through the adjacent portion of the glass windshield 17 thereby preventing accumulation of coatings of moisture on the outer surfaces of the heated glass. The lateral spacing of the wires 21, 22, 23 should be such that effective distribution of the heat to all portions of the glass surfaces, is assured, and the leaf springs 24, 25 serve to maintain the wires 21, 22, 23 taut at all times, thereby preventing the hot wires which are obviously elongated when heated, from sagging and from coming in contact with the adjacent surfaces of the sheet 7 and windshield 17.

The wires 21, 22, 23 may obviously be quickly deenergized by merely withdrawing the plug 32 from the terminals 29, 30, and the frame 6 may be readily removed during seasons when the device is unnecessary, by merely releasing the caps 20. In cases where the vision obstructing tendency is not extreme, as when the windshield is merely subjected to fog or other slight moisture deposits, the wires 21, 22, 23 may be omitted and the confined body of air will be sufficient to maintain clear vision on the adjacent external surfaces of the air confining glass. The heating system when used, may obviously be energized from any suitable source such as the ignition system or battery of the automobile, and the current is delivered through the wires 21, 22, 23 in parallel.

The sheet metal frame 6 is preferably stamped out of a single sheet of material and may be plated or enameled to present a neat appearance. The portion of the sheet which is cut from the center, is utilized in the manufacture of other accessories, thus eliminating waste of stock, and the one piece frame construction insures the requisite rigidity in the assembled structure. The elements 9 may be formed of rubber or other material which permits firm cementing thereof to the windshield 17, and the appliance has demonstrated its ability to effectively prevent accumulation of vision obstructing coatings in all kinds of weather and without the aid of a wiper or other auxiliary apparatus. The frame 6 and bands 13, 14 being formed of relatively thin and resilient material, and the latter contacting only with the soft sealing strip 8, avoids undesirably stressing the sheet 7 or the windshield 17, and the resilient flange 10 additionally protects the sheet 7 against breakage and maintains a tight joint.

It should be understood that it is not desired to limit the invention to the exact details of construction herein shown and described, for various modifications within the scope of the claims may occur to persons skilled in the art.

It is claimed and desired to secure by Letters Patent:

1. In combination, a frame, a transparent sheet coacting with said frame, a continuous sealing strip coacting with said sheet adjacent to said frame, heating means within said frame adjacent to said sheet, and a conductor band for energizing said means, said band being insulated from said frame and coacting with said strip throughout substantially its entire length to secure the same to said frame and in contact with said sheet.

2. In combination, a frame having a resilient flange, a transparent sheet having one side thereof coacting with said flange, a continuous pliable sealing strip coacting with said frame and with the opposite side of said sheet, heating means within said frame, and a conductor band for energizing said means, said band being insulated from said frame and coacting with said strip throughout substantially its entire length to secure the same to said frame and in contact with said sheet.

3. In combination, a frame having a peripheral wall, a transparent sheet disposed within said wall, a continuous sealing strip coacting with said wall and with said sheet, a pair of relatively insulated conductor bands insulated from said frame and coacting with said strip throughout substantially its entire length, and a plurality of wires connecting said bands.

4. In combination, a frame having a peripheral wall, a transparent sheet disposed within said wall, a continuous sealing strip coacting with said wall and with said sheet, a pair of conductor bands insulated from each other and from said frame, said conductor bands coacting with said strip to clamp the same to said frame wall, a plurality of heating wires spanning said frame and connected to one of said bands, and an independent leaf spring connecting each of said wires to the other of said bands.

5. In combination, a frame having a peripheral wall, a transparent sheet disposed within said wall, a continuous sealing strip coacting with said wall and with said sheet, a pair of conductor bands insulated from each other and from said frame, said conductor bands coacting with said strip to clamp the same to said frame wall, a plurality of heating wires spanning said frame and connected to one of said bands, and an independent leaf spring secured to the free end of each wire and extending at an oblique angle toward the other of said bands.

6. In combination, a frame having a clamping portion, a transparent sheet coacting with said clamping portion, a continuous relatively soft sealing strip coacting with the edge portion of said sheet in opposition to said clamping portion, a retainer band spaced from said sheet and coacting only with said strip throughout substantially the entire length of the latter to secure said strip to said frame and in contact with said sheet, and heating means carried by said band and frame within the latter and adjacent to said sheet.

7. In combination, a frame having a clamping portion, a transparent sheet coacting with said clamping portion, a continuous relatively soft sealing strip coacting with the edge portion of said sheet in opposition to said clamping portion, a retainer band comprising a plurality of sections spaced from each other and from said sheet and providing a substantially continuous piece coacting only with said strip throughout substantially the entire length of the latter to secure said strip to said frame and in contact with said sheet, and heating means carried by said band and frame within the latter and adjacent to said sheet.

8. In combination, a frame having an outer wall and an inwardly projecting flange, a transparent sheet disposed within said wall and coacting with said flange, a continuous relatively soft sealing strip coacting with said sheet in opposition to said flange, a retainer band spaced from said sheet and coacting only with said strip throughout substantially the entire length of the latter to secure said strip to said wall and in contact with said sheet, and a plurality of heating elements secured to said band and frame and disposed within the latter adjacent to said sheet.

9. In combination, a frame having an outer wall and an inwardly projecting flange, a transparent sheet disposed within said wall and coacting with said flange, a continuous relatively soft sealing strip coacting with said sheet in opposition to said flange, a retainer band comprising a plurality of sections spaced from each other and from said sheet and providing a substantially continuous piece coacting only with said strip throughout substantially the entire length of the latter to secure said strip to said wall and in contact with said sheet, and a plurality of heating elements secured to said band and frame and disposed within the latter adjacent to said sheet.

JOEL R. THORP.